Patented June 16, 1936

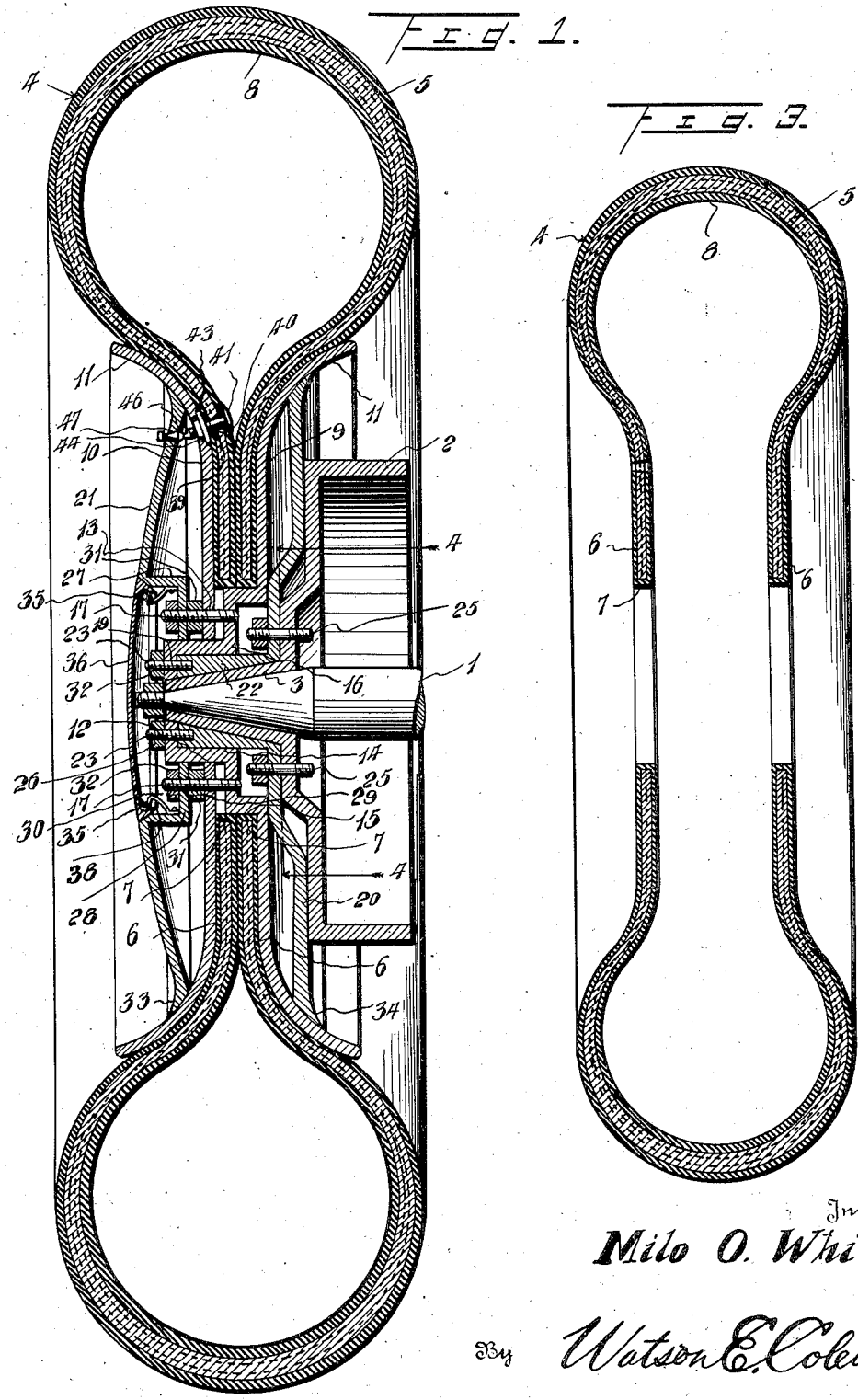

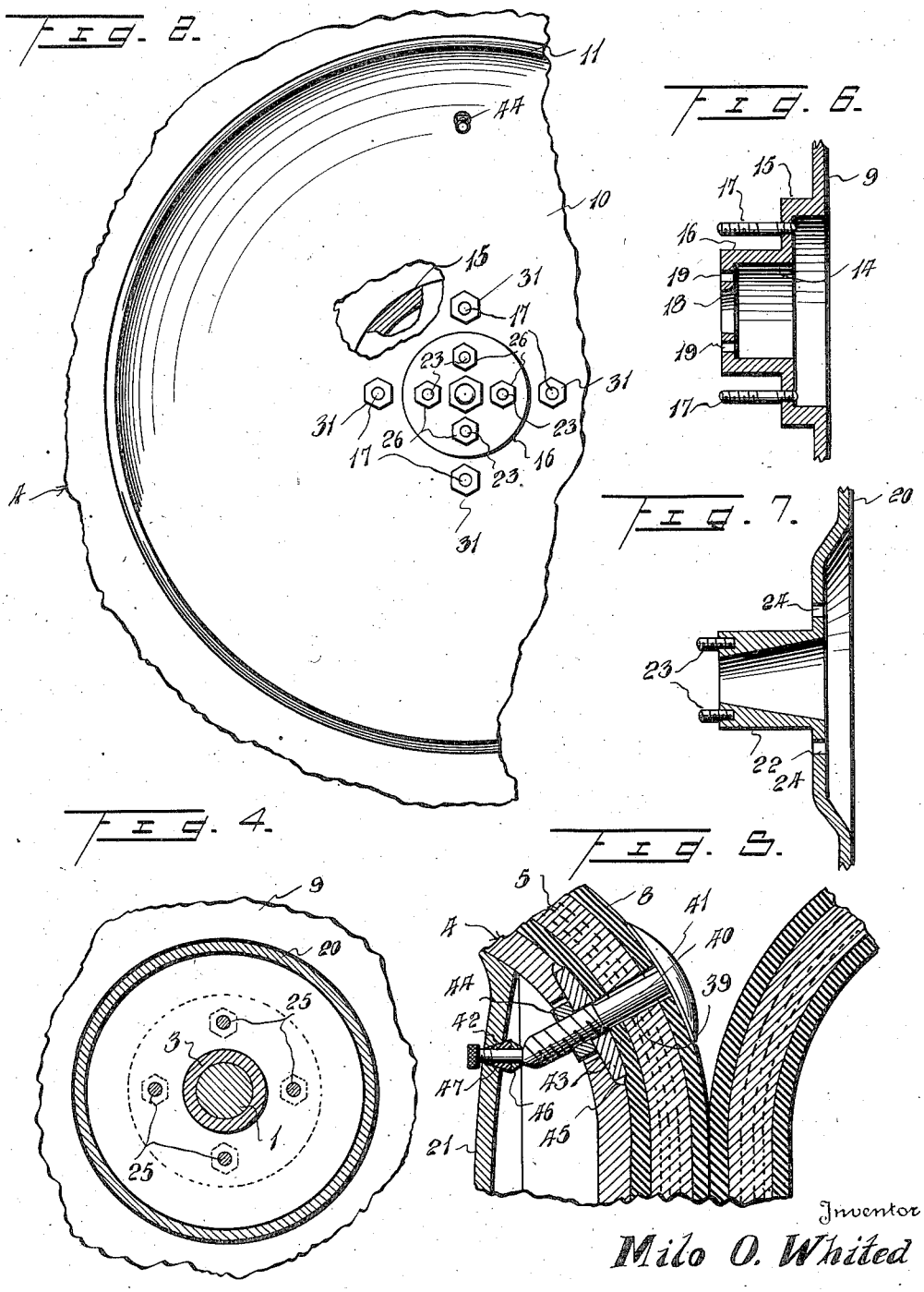

2,044,654

UNITED STATES PATENT OFFICE 2,044,654

PNEUMATIC WHEEL

Milo O. Whited, near Centralia, Wash.

Application October 1, 1935, Serial No. 43,121

7 Claims. (Cl. 152—29)

This invention relates to the class of tires and wheels and pertains particularly to an improved pneumatic wheel structure.

The primary object of the present invention is to provide an improved pneumatic wheel structure in which the air-retaining casing is of novel construction and forms the sole means of carrying the air, thus doing away with the usual removable inner tube of the wheels at present in use.

Another object of the invention is to provide a novel pneumatic wheel structure in which the tire casing has inwardly extending side walls which are gripped or compressed between opposing plate members which provide, in addition to a supporting means for the tire casing, a hub structure for the reception of a carrying axle.

A still further object of the invention is to provide a pneumatic wheel structure having an annular casing with flat side walls each centrally apertured and opposing gripping plates between which said side walls are held and which provide a hub structure, and novel means for covering the securing elements by which the said plates are joined together whereby the outside of the central portion of the wheel structure will have the appearance of an unbroken disk.

A still further object of the invention is to provide in a wheel of the character described, a casing having a novel inner wall structure whereby the contacting surfaces are sealed against the passage of air therebetween when the wheel structure is assembled and whereby an opening formed by a puncturing element will be closed immediately upon the withdrawal of the element by the forcing together of the inner surface material under the influence of the internal air pressure.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings

Fig. 1 is a view in vertical transverse section through the pneumatic wheel embodying the present invention showing the same applied to an axle.

Fig. 2 is a view in elevation of a portion of the center of the wheel with the outer plate removed.

Fig. 3 is a sectional view through the casing, same being on a reduced scale.

Fig. 4 is a sectional view on the line 4—4 of Fig. 1.

Fig. 5 is a detail sectional view showing the valve assembly.

Fig. 6 is a detail sectional view thru the central part of one plate member.

Fig. 7 is a detail sectional view thru the central part of another plate.

Referring now more particularly to the drawings, wherein like numerals of reference indicate corresponding parts throughout the several views, Fig. 1 illustrates the application of the present tire structure to a vehicle axle, the tire structure being shown in section. The axle is indicated by the numeral 1 and has upon it the usual brake drum 2 which has a hub portion 3 through which the tapered end of the axle extends.

The wheel structure embodying the invention consists of a casing which is indicated generally by the numeral 4. This comprises an annular portion 5 which is substantially circular in cross section but which is split upon its inner side and has the edges extended into the central flat side wall portions 6, each of which has a central opening 7 therethrough. This casing may be constructed in the usual manner of making tire casings, with the exception that the inner surface has a layer of pure gum rubber. This surface is indicated by the numeral 8 and it is preferably thickened over the portion of the casing adjacent the tread and over the inner surfaces of the flat sides 6.

The numerals 9 and 10 indicate respectively inner and outer casing gripping plates, between which the portions 6 of the casing are disposed. The plates at their outer portions are dished or flanged, as indicated at 11, and these flanges are oppositely directed in the assembled structure, as indicated in Fig. 1.

The plate 10 is provided with a central opening 12 and surrounding this opening are bolt holes 13, while the plate 9 is formed to provide a hub portion 14 which is formed to have two diameters whereby a pair of shoulders 15 and 16 is obtained. The portion of the hub 14 which is of smaller diameter extends through and fits snugly in the opening 12 of the outer plate and the edges of the openings 7 of the casing, when the portions 6 thereof are brought into abutting relation in the manner shown in Fig. 1, engage the shoulder 15. When the plates 9 and 10 have been brought into side-by-side relation with the portions 6 of the tire casing compressed therebetween, they are held in this manner by the bolts 17, each of which is fixed at one end in the hub 14 between the shoulders 15 and 16, to extend parallel with the axis of the wheel. The outer end of the hub portion 14 has the inwardly turned flange 18 in which bolt openings 19 are formed for the purpose hereinafter described.

The tire casing engaging and clamping plates 9 and 10 are disposed between the inner and outer compressing plates 20 and 21 respectively. The inner plate 20 has a hub portion 22 which is interiorly tapered to conform with the exterior configuration of the part 3 of the wheel drum upon which it is mounted, while the outside is of cylindrical form. The free end of the hub 22 has the threaded bolts 23 tapped thereinto and extending therefrom parallel with the axis of the wheel, while the body of the plate 20 adjacent the hub is provided with bolt openings 24 through which bolts 25 are passed into the body of the drum 2 to secure the plate 20 thereto.

As shown in Fig. 1, the plate 20 is disposed between the drum 2 of the wheel and the casing engaging plate 9 and the portion of the hub 14 of the plate 9 which is of smaller diameter, snugly receives the hub 22, so that the flange 18 abuts the outer end of the hub 22 and the bolts 23 extend through the openings 19 of this flange and receive securing nuts 26 which hold the two plates in assembled relation.

The outer clamping plate 21 is dished, and when in assembled relation with the other parts of the wheel has its concave face in opposed relation with the plate 10. This plate 21 has the central inset annular portion 27 which terminates in the inwardly directed flange 28 which has bolt openings 29 therethrough thus forming a circular recess 30 which faces or is directed outwardly from the wheel. The bolt openings 29 of the flange 28 receive the outer ends of the bolts 17 by which the plates 9 and 10 are coupled, and nuts 31 are placed on these bolts to draw the plates 9 and 10 together, and other nuts 32 are placed on the outer ends of the bolts 17 to draw the flange portion 28 of the plate 21 inwardly so that its periphery which is slightly broadened to form a shoe 33, will be drawn in tightly against the face of the outwardly directed flange 11 of the plate 10. As shown in Fig. 1, the inner clamping plate 20 also has its periphery broadened to form a wide contacting surface as indicated at 34, and this surface engages the convex surface of the portion 11 of the inner casing securing plate 9.

Within the recess 30 of the plate 21 resilient clamping fingers 35 are secured to the inwardly directed wall portion 27. These resilient fingers coact with the circular cover plate 36, to retain the latter in position over the recess 30 by receiving between them and the adjacent wall 27 the inwardly turned lip 38 on the cover plate 36.

From the foregoing it will be apparent that all of the parts of the vehicle structure with the exception of the plate 20, may be kept assembled for application to the vehicle axle. The plate 20 will remain in position and secured to the drum 2 and when the wheel is to be taken off for repair or other purposes, it is merely necessary to remove the nuts 26 so as to release the connection between the end of the hub 22 and the flange 18 of the plate 9. It will be apparent, of course, that in order to do this the central plate or disk 36 must be removed as this, when in position, covers the ends of the bolts 17 and 23, the nuts carried thereby, and the end of the axle 1.

Upon the outside of the casing, the wall thereof adjacent the point where it merges into the tapered part 6, is provided with a passage 39 through which a valve stem 40 extends. This stem has upon its inner end the plate 41 which contacts with the inner surface of the casing and a portion of its outer end is angularly extended, as indicated at 42, for extension through the curved clamping plate 21. Adjacent the point of connection between the body 40 of the valve stem and the angular portion 42, the body has screw-threads for the reception of a clamping nut 43 and a locking nut 44, the clamping nut being merely for compressing the portion of the casing lying between it and the plate 41 at the inner end of the valve stem, and the locking nut 44 being provided to prevent the clamping nut from moving from position after it has been set.

The inner surface of the plate 10 is provided with a recess 45 suitable to receive the clamping nut 43 and the locking nut 44, and the angular portion 42 of the stem carries a washer 46 and a cone-shaped body of rubber 47 which abuts against the washer and which wedges into the aperture in the plate 21 through which the end of the stem extends. This body 47 serves as a means for preventing moisture and other matter entering the interior of the wheel.

By making the inner surfaces of the portion 6 of the casing with a coating of soft rubber, it will be apparent that the bringing together of these portions will effect the compression of this lining material so that leakage of air from the casing cannot occur. Also the coating of the interior portion of the casing adjacent the tread will provide material which will close up any small openings which may be formed in the event of a puncture.

From the foregoing it will be apparent that a tire constructed in accordance with the present invention eliminates the expense of using inner tubes such as are necessary with wheels of the type at present in use, and also in the event of the formation of an opening or hole in the casing of too great a size for the soft rubber lining material to close, the interior of the casing can be easily reached for the application of a patch which will be firmly held in position by the air pressure therein when the casing is again put into use.

It will also be apparent that when this tire gets flat, it will not come off of the rim, as the present-day type of tire frequently does, particularly when the flat occurs while the wheel is rotating at a high speed.

What I claim, is:

1. In a pneumatic wheel, a circular hollow casing having spaced side walls and a central opening, a pair of inner plates having the central part of the casing therebetween, one of said plates having a portion extending thru said opening and secured to the other plate, a pair of outer plates having the inner plates and tire therebetween and secured thereto at the center of the wheel, one of said outer plates having a hub extending through the extended portion of the said one of the first plates, and a valve stem carried by the casing and extending thru an adjacent two of the inner and outer plates.

2. In a pneumatic wheel, an air casing of annular design, opposed plate members having the central portion of the casing compressed therebetween, a hub forming a portion of one plate member and passing thru the casing, said hub having two different exterior circumferential surfaces joined by a radially directed portion, said other plate opposing and being secured to said portion, said plates each having a peripheral portion flared outwardly away from the casing, valve means for introducing air into the casing, and means secured in said hub facilitating mounting the wheel upon an axle.

3. In a pnematic wheel, an air casing of annular design, opposed plate members having the central portion of the casing therebetween, a hub formed integrally with one plate and passing thru the casing and the other plate and secured to the latter, a second pair of plate members having said first members therebetween and each having its peripheral edge in abutting relation with the adjacent plate, a hub forming a part of a plate of the second pair and extending thru the first hub, means securing the hubs together, means securing the other plate of said second pair to the plate of the first pair adjacent thereto, said second mentioned hub being designed to receive an axle, and means for introducing air into the casing.

4. In a pneumatic wheel, an air casing comprising a hollow circular body having a transversely rounded periphery and spaced side walls each of which has a central opening, a pair of opposed plates having said side walls therebetween, one of said plates having a central opening, a hub upon the other plate extending thru the said tire wall openings and the plate opening and having two external encircling shoulders against one of which the edges of the wall opening abut and against the other of which the edge of the plate opening abuts, means securing the apertured plate to the hub to compress the casing walls between the plates, means facilitating the mounting of said hub on an axle, and means for introducing air into the casing.

5. In a pneumatic wheel, an air casing comprising a hollow circular body having a transversely rounded periphery and spaced side walls each of which has a central opening, a pair of opposed plates having said side walls therebetween, one of said plates having a central opening, a hub upon the other plate extending thru the said tire wall openings and the plate opening and having two external encircling shoulders against one of which the edges of the wall opening abut and against the other of which the edge of the plate opening abuts, means securing the apertured plate to the hub to compress the casing walls between the plates, means facilitating the mounting of said hub on an axle, and means for introducing air into the casing, a second pair of plates having said first plates therebetween, each of said first plates having an outwardly curved peripheral portion substantially conforming to a portion of the curvature of the casing, each of the second mentioned plates having its edge contacting the outer concave face of a said outwardly curved portion, one of the second pair of plates having a hub extending through and secured to the first hub and designed to receive an axle, the other of the second pair of plates being secured to an adjacent one of the first plates, and means carried by the last mentioned plate of the first pair for covering the securing means between the plates and the hubs and axle.

6. A pneumatic wheel, comprising a hollow circular casing body having spaced side walls each having a central opening therethrough, a pair of plates having said side walls therebetween, one of said plates having a tubular hub portion extending through the side wall openings and exteriorly formed to provide two concentric surfaces of different circumferences, the surface of smaller circumference being at the free end of the hub and extending through the center of the other plate, the two circumferential surfaces being joined by a wall, securing means between the said other plate and said wall, means adapting said hub to an axle, a disc overlying and concentric with the said other plate and having a central opening receiving the said free end of the hub, said securing means also securing said disc relative to the adjacent plate, valve means for the body, and a cover plate detachably secured over the center of said disc over said securing means and the end of the hub.

7. A pneumatic wheel, comprising a hollow circular casing body having spaced side walls each having a central opening therethrough, a pair of plate members disposed with said side walls compressed therebetween, one of said plate members having a central opening, a tubular hub integral with the other plate member and having a portion adjacent the plate of an interior and exterior circumference greater than the portion at the outer end of the hub, the two portions of the hub being joined by a radial wall and the said outer portion of the hub being extended through the opening of the first mentioned plate, bolt means connecting the first mentioned plate with said radial wall, a second pair of plates having the first mentioned plates therebetween and having their peripheral edges in contact with the adjacent ones of the first mentioned plates, a hub formed integral with one of the second mentioned plates and having an end extending into and snugly fitting the smaller outer end portion of the first mentioned hub, the hub of said second mentioned plate being formed to receive an axle, the other one of said second mentioned pair of plates having an inpressed circular portion provided with a central aperture receiving the outer end of the first mentioned hub and secured thereto by said bolt means, means coupling the ends of said hubs together, a plate member removably positioned from and closing the depressed area of the said other one of the second mentioned plates, and valve means for introducing air into the casing.

MILO O. WHITED.